Patented Sept. 7, 1954

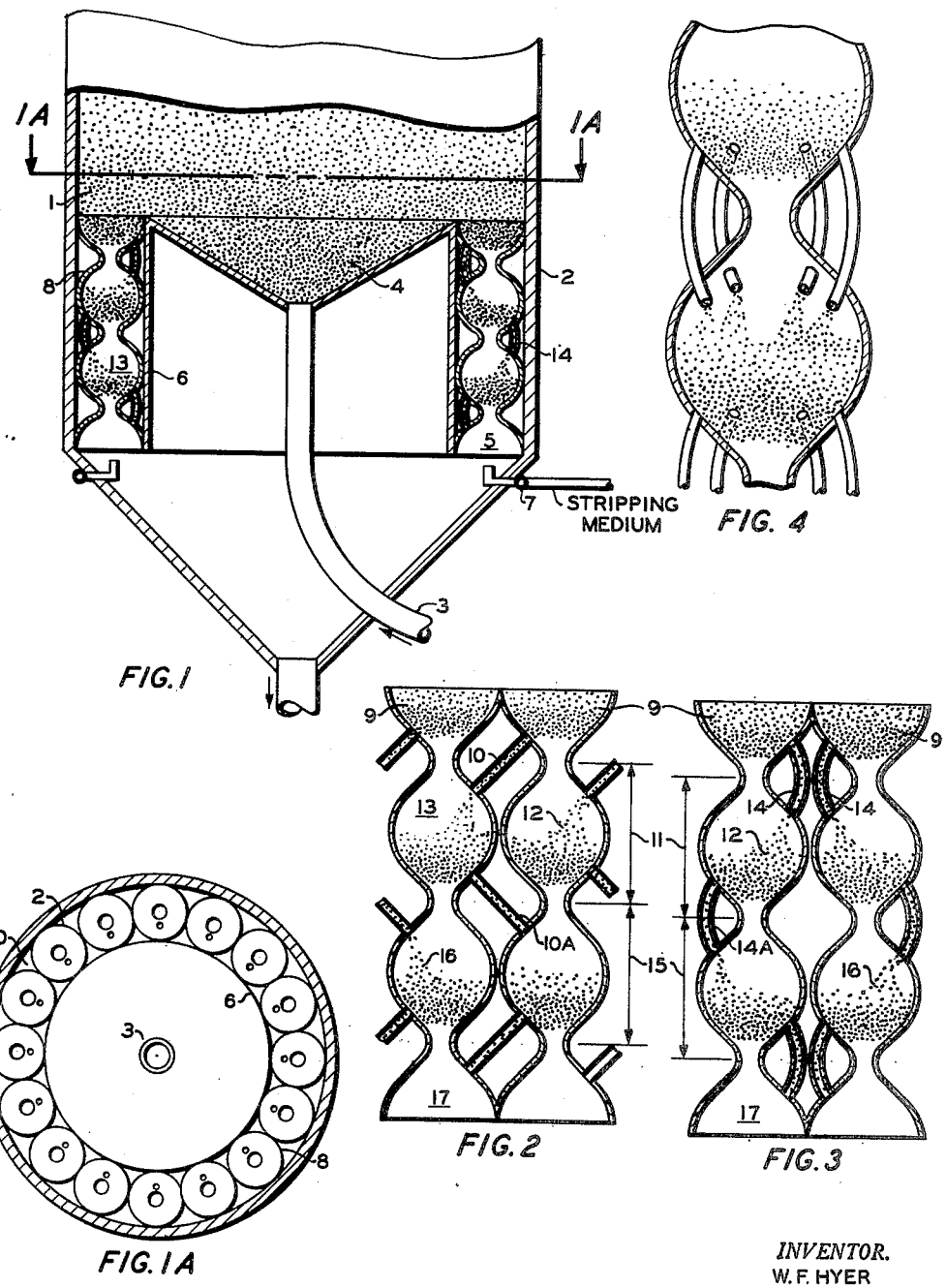

2,688,195

UNITED STATES PATENT OFFICE 2,688,195

FLUIDIZED CATALYST STRIPPING APPARATUS

William F. Hyer, Bartlesville, Okla., assignor to Phillips Petroleum Company, a corporation of Delaware Application December 14, 1950, Serial No. 200,835

4 Claims. (Cl. 34—57)

This invention pertains to apparatus for stripping vapors and gases from a body of particulate material. In another aspect this invention pertains to apparatus for stripping hydrocarbons and/or regeneration gases from a fluidized catalyst in a catalytic hydrocarbon conversion process.

The removal of entrained or adsorbed oil or vapors from the spent catalyst is one of the most important operations in the fluid catalytic cracking process. Any entrained or adsorbed oil or vapors in the catalyst must be burned in the regenerator and, since in many units the carbon burning capacity determines the charging capacity of the unit, it is important that this oil and vapor be removed before the spent catalyst is charged to the regenerator.

In the prior art a great variety of means have been provided for stripping fluidized catalyst effluents from a hydrocarbon conversion zone and from a catalytic regeneration zone. Ordinarily, such means entails contacting a downwardly moving column of such catalyst with a stripping medium, such as steam or other substantially inert gas. There are two methods applicable to the stripping of fluidized catalyst. According to one of these methods, the best stripping is obtained when the catalyst is contacted with the stripping medium while in a substantially dense phase, such as that existing in an aerated column of catalyst moving downwardly through a standpipe. According to the other method, the best stripping action is provided when the fluidized catalyst is in a highly dispersed phase, such as that existing above an ordinary fluidized bed of catalyst. In a third method there is a combination of steps involving stripping of the catalyst in three stages, to wit, dense, less dense and dense phases.

According to this invention, there is provided apparatus for stripping catalyst wherein the catalyst is alternately highly dispersed in the stripping medium and concentrated in the stripping medium. Thus, in the apparatus of this invention, the catalyst is stripped alternately in a dense phase and in a diffuse phase.

According to the practice of this invention the particulate solid material, the stripping medium and entrained vapors are subjected to alternate conditions of compression and expansion which results in a more rapid and thorough detachment of the entrained vapors from the particulate solid material. This alternate increase and decrease in the pressure on the particulate solid material, the stripping medium and the entrained vapors is accomplished by alternate areas of relative high velocity and relative low velocity due to the configuration of the apparatus through which these particles and elastic fluids flow as hereinafter more fully described and explained.

An object of this invention is to provide an improved apparatus for stripping vapor or gas from a body of particulate solid material.

Another object of this invention is to provide an improved apparatus for stripping a fluidized catalyst.

A further object of this invention is to provide apparatus for stripping a fluidized catalyst wherein the vapors flow in an upward direction and the fluidized catalyst is conducted downwardly through bypass conduits.

A further object of this invention is to more thoroughly detach entrained vapors and gases from a fluidized catalyst by alternate compression and expansion of said materials.

I have found that when a fluidized catalyst is allowed to flow downwardly through an hourglass shaped structure countercurrently to an upwardly flowing stripping gas that there results alternately dense phases and dispersed phases of the fluidized catalyst. I have further found that channelling or formation of slugs of the stripping gas can be avoided by conducting substantially all the particulate mass of catalyst downwardly through bypass conduits instead of through a restricted portion of the hourglass shaped structure. Positive downward flow of the catalyst is obtained by the static head of material in the said bypass conduits which head therein is greater than the static head in the restricted portions of the hourglass shaped structure.

In the embodiment about to be described substantially all the catalyst mass is conducted through a bypass from the dense phase of an upper enlarged portion of an hourglass shaped structure to the diffuse phase of the next lower enlarged portion of said structure.

Herein and in the appended claims "hourglass shaped zone" or "hourglass shaped structure"

means a vertical more or less cylindrical zone or vessel whose walls gradually converge and diverge to form a plurality of interconnected alternate large and small diameter zones.

Referring to the drawings, Figure 1 shows the stripping apparatus of this invention disposed within a catalytic conversion zone and Figure 1A a cross section on line 1A—1A of Figure 1. Figures 2 and 3 are views of the stripping apparatus showing in detail the mode of construction thereof. Figure 4 shows a modification of the arrangement of the bypass conduits. In Figure 1 a fluidized bed is maintained in vessel 2 after it emerges from transport line 3 and distributing means 4. After the catalyst has been contaminated with sufficient carbonaceous material to require regeneration, it is withdrawn through passageway 5 formed by annular cylinder 6, cover 20 and the walls of vessel 2. Steam or other stripping medium is injected into passageway 5 by one or more lines 7. Passageway 5 also includes a plurality of hourglass shaped structures, generally designated as 8 and shown more completely in Figures 2 and 3. In Figures 2 and 3 in accordance with this invention, the catalyst to be stripped flows from fluidized bed 1, of Figure 1, into the first section of the stripping zone and forms therein a dense phase designated as 9. The catalyst from this phase flows downwardly through conduit 10 or 14 into the next stripping area of the stripping apparatus designated as 11. In 11 the catalyst forms a fluidized bed 12 and a dispersed phase 13. Catalyst from bed 12 flows downwardly through conduit 14A or 10A into the next section of the stripping apparatus 15 where it will again form a fluidized bed 16. As stated, stripping steam is injected through line 7 and will pass upwardly through opening 17 through the series of fluidized beds thereabove. The rate at which the stripping steam is injected into the stripping apparatus is so adjusted that the velocity of the stripping gas passing through the restricted portions of the hourglass shaped stripping apparatus is sufficiently high to prevent any substantial amount of catalyst from falling through the restricted sections. However, the rate is low enough to insure that a bed of fluidized catalyst will be formed immediately above such restricted sections, for example, as bed 12. The depth of such bed will be determined by the shape of the hourglass figure to provide a dispersed phase 13 wherein the stripping gas will be in the zone of least velocity but will then begin to increase in velocity due to the decreased cross-section of the hourglass figure. Catalyst flowing from an upper fluidized bed through connecting conduits, such as 10 and 14, will be dispersed in dispersed phase 13 and will fall therethrough into the fluidized bed 12. Thus, it is apparent that the catalyst to be stripped will alternately form in fluidized beds, such as 12, and in a dispersed phase, such as 13, thereby insuring complete stripping of the catalyst.

Figure 4 shows a modification of this invention wherein a plurality of bypass means discharge the particulate material, such as fluidized catalyst, from the dense phase bed, into the dispersed phase zone of the lower enlarged portion of the hourglass shaped structure and may be at different points and at different levels resulting in more efficient dispersion of the solid particles.

Reasonable variation and modification are possible within the scope of the foregoing disclosure, drawing and claims to the invention the essence of which is the provision of apparatus for stripping a fluidized solid catalyst wherein the catalyst is conducted downwardly from the dense phase of the upper larger portion of an hourglass shaped apparatus through a bypass conduit to the dispersed phase of the lower larger portion of the hourglass shaped apparatus and the upwardly flowing gases are subjected to alternate compression and expansion by virtue of the hourglass shape of the apparatus which results in alternate stages of relatively high velocity flow and relatively low velocity flow.

I claim:

1. In a fluidized catalyst hydrocarbon conversion apparatus an elongated vertically disposed and substantially cylindrical vessel, a substantially concentrically disposed inner cylinder forming a wall parallel to and separated from the wall of said vessel, said inner cylinder thus forming an annular space between said inner cylinder and the wall of said vessel and said annular space being in communication with the upper and lower zones of said vessel, said annular space containing a plurality of hourglass shaped structures through which the said fluidized catalyst is downwardly passed, bypass means from a lower portion of a large diameter zone of said hourglass structure to an upper portion of a large diameter zone below, means for injecting a stripping gas into the lower portion of said hourglass shaped structure, means for introducing fluidized catalyst and hydrocarbon through said inner cylinder to form a bed of catalyst in said vessel, vapor draw-off means at the top of said vessel and means for removing said catalyst from the bottom of said vessel.

2. In a fluidized catalyst regeneration apparatus an elongated vertically disposed substantially cylindrical vessel, a substantially concentrically disposed inner cylinder forming a wall parallel to and separate from the wall of said vessel, said inner cylinder thus forming an annular space between said inner cylinder and the wall of said vessel and said annular space being in communication with the upper and lower zones of said vessel, said annular space containing a plurality of hourglass shaped structures through which said fluidized catalyst is downwardly passed, by-pass means from a lower portion of a large diameter zone of said hourglass structure to an upper portion of a large diameter zone below, means for injecting a stripping gas into the lower portion of said hourglass shaped structure, means for introducing fluidized catalyst and regeneration medium through said lower cylinder to form a bed of catalyst undergoing regeneration in said vessel, vapor drawoff means at the top of said vessel and means for removing said regenerated and stripped catalyst from the bottom of said vessel.

3. In a fluidized catalyst hydrocarbon conversion apparatus an elongated vertically disposed and substantially cylindrical vessel; means for introducing fluidized catalyst and hydrocarbon so as to form a bed of catalyst in said vessel; means for removing catalyst from the lower portion of said vessel; an elongated hourglass-shaped vessel having an uninterrupted opening therethrough said hourglass-shaped vessel being intermediate said introducing and removing means; uninterruptedly open bypass means extending from a lower portion of a large diameter zone of said hourglass-shaped vessel into an upper portion of a large diameter zone therebelow.

4. In an apparatus for stripping a fluidized catalyst with a stripping gas, an elongated vertically disposed hourglass-shaped vessel, an uninterrupted passageway at the narrow portion of said vessel, a plurality of by-pass means for fluidized catalyst having inlet openings from a lower portion of an upper large diameter zone of said vessel and outlet openings into an upper portion of a lower large diameter zone of said vessel, said outlet openings being arranged at different levels.

References Cited in the file of this patent

UNITED STATES PATENTS

| Number | Name | Date |
|---|---|---|
| 1,459,326 | Dow | June 19, 1923 |
| 2,391,336 | Ogorzaly | Dec. 18, 1945 |
| 2,444,990 | Hemminger | July 13, 1948 |
| 2,488,031 | Gunness | Nov. 15, 1949 |
| 2,490,993 | Borcherding | Dec. 13, 1949 |
| 2,522,704 | Laval | Sept. 19, 1950 |
| 2,538,833 | Rycke | Jan. 23, 1951 |
| 2,607,662 | Huff | Aug. 19, 1952 |

FOREIGN PATENTS

| Number | Country | Date |
|---|---|---|
| 463,060 | Great Britain | Mar. 22, 1937 |